US 6,721,542 B1

(12) United States Patent
Anttila et al.

(10) Patent No.: US 6,721,542 B1
(45) Date of Patent: Apr. 13, 2004

(54) SYSTEM FOR LOCATION SPECIFIC, AUTOMATIC MOBILE STATION BEHAVIOR CONTROL

(75) Inventors: Akseli Anttila, Helsinki (FI); Mikko Makipaa, Helsinki (FI); Heikki Rautila, Helsinki (FI); Petteri Saarinen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/322,531

(22) Filed: May 28, 1999

(51) Int. Cl.[7] .............................. H04Q 7/20; H04Q 7/34
(52) U.S. Cl. ..................... 455/68; 455/456.1; 455/457; 455/456.4
(58) Field of Search ................ 455/68, 456, 457, 455/550, 445, 421, 422, 461, 462, 9, 403, 410, 411, 521, 575, 351, 352, 353, 404, 517, 67.1, 414.1, 414.2, 456.1, 456.2, 456.3, 456.4, 456.5, 456.6

(56) References Cited

U.S. PATENT DOCUMENTS

| 5,479,482 | A | * | 12/1995 | Grimes ........................ 455/404 |
| 5,559,886 | A | * | 9/1996 | Dent et al. .................. 455/410 |
| 5,778,304 | A | * | 7/1998 | Grube et al. ................ 455/456 |
| 5,815,407 | A | | 9/1998 | Huffman et al. |
| 6,011,973 | A | * | 1/2000 | Valentine et al. ........... 455/456 |
| 6,085,096 | A | * | 7/2000 | Nakamura ................... 455/456 |
| 6,188,883 | B1 | * | 2/2001 | Takemura .................... 455/411 |
| 6,233,448 | B1 | * | 5/2001 | Alperovich et al. ......... 455/456 |
| 6,233,460 | B1 | * | 5/2001 | Nojima ....................... 455/550 |

FOREIGN PATENT DOCUMENTS

| DE | 197 44 263 C | 5/1999 |
| GB | 2 300 787 A | 11/1996 |

OTHER PUBLICATIONS

Weiss K et al.; "Conventional Local Area Radio Coverage System"; Motorola Technical Developments; Jul. 1, 1991 pp. 67–69; Motorola Inc., Schaumburg, Illinois, USA.

* cited by examiner

*Primary Examiner*—William Trost
*Assistant Examiner*—Keith Ferguson
(74) *Attorney, Agent, or Firm*—Wayne M. DeMello

(57) ABSTRACT

A system and a method for modifying the behavioral characteristics of a mobile station terminal according to a functional location. A small transmitter, or button, which utilizes short range radio transmissions is used to define a functional location. The button is identified with particular functions using a device ID. In some of the disclosed embodiments, the button transmits the device ID continuously. In some other disclosed embodiments, the button transmission is triggered by a mobile station in proximity to the button. In some of the disclosed embodiments, the mobile station can store a mapping of device IDs to particular behaviors (or functions). In some other disclosed embodiments, the mobile station can request and receive a set of behaviors based on the device ID from a server attached to a telecommunications network. In some of the disclosed embodiments, receipt of a device ID can trigger a remote set of behaviors via a telecommunications network.

26 Claims, 3 Drawing Sheets

SYSTEM FOR LOCATION SPECIFIC, AUTOMATIC MOBILE STATION BEHAVIOR CONTROL

FIELD OF THE INVENTION

This invention relates to mobile station communications and, more particularly to location dependent behavior in a mobile station.

BACKGROUND OF THE INVENTION

An increasingly common problem faced by mobile station users is that of prohibition of use. Reasons for such prohibitions vary, generally according to location. For example, operation of an electronic device, such as a mobile station, during the take-off and landing operations of an aircraft can interfere with electronic signals which are critical to the operation of the aircraft. As a result, the FAA prohibits the operation of certain electronic devices by passengers during take-off and landing operations. However, this prohibition does not ensure that deliberate violators and careless passengers will not operate their electronic devices during such critical periods. A means of addressing this specific hazard is disclosed in U.S. Pat. No. 5,815,407, entitled "Method and Apparatus for Inhibiting the Operation of an Electronic Device During Take-Offs and Landings of an Aircraft." Prohibitions on mobile station use due to critical operations can also occur in other environments. Such environments can include, for example, hospitals and other areas where sensitive medical instruments may need to be protected from possible radio frequency interference (RFI) caused by mobile stations.

In addition to prohibitions on the use of mobile stations and other electronic devices, warning devices which detect the radio frequency (RF) transmission of a mobile station may also be used. Such devices are based on the detection of a radio transmission sent by an electronic device such as a mobile station. The warning device can indicate RFI detection by an audio signal or warning lights. However, the warning device is merely reactive. That is, it does not register an alarm in absence of RFI detection. Therefore, until a mobile station is participating in a call or making location updates to a registered system, the warning device will not indicate a problem. By the time RFI is indicated, the interference has occurred. At this point, mere detection of the interference may not be enough to avoid the problems it can cause. Another drawback of the RFI warning device is that it does not indicate, with adequate precision, the source of the RFI. That is, the warning device cannot unambiguously indicate which particular mobile station is activated. This lack of precision can cause a delay in pinpointing the RFI source. Thus, the elimination of the RFI by switching off the source is delayed.

Secondary reasons may also exist for prohibiting or limiting the use of mobile stations in public and private areas. For example, in some areas, it may be particularly important that a mobile station that is in operating mode, i.e., ready to send and receive communications, does not cause a disturbance, for example, by ringing.

The ability to impart location dependent functionality to mobile stations is impeded due to the limits in both scope and accuracy of current positioning systems. The systems currently available are incapable of providing the positioning detail required for controlling mobile station behavior in a specific location. Systems using triangulation, signal strength indicators, or time difference of arrival systems, such as GPS, each have requirements which, in the context of mobile stations, such as handheld cellular telephones, make them unsuitable for implementing location specific, automatic terminal behavior control. By design, such systems require specially adapted receivers at the mobile station to receive and process the pilot tones, GPS signals, etc. Such sophisticated end equipment can substantially increase the cost of a mobile station. Also, the addition of special equipment can result in a handset which is extremely bulky and difficult to manipulate. This added weight and size can be detrimental to mobile stations which are handheld cellular telephones.

An additional drawback to current positioning systems is that when applied to wireless communications of interest to end consumers, i.e. communications in the 800 MHz to 2.5 GHz frequency band, the anticipated use of excessive frequency spectrum makes them undesirable.

A location dependent system is needed which is compatible with existing mobile stations. That is it should not degrade the operation or ergonomics of an existing system. In addition, a location dependent system should not require the allocation of more radio frequencies than are currently allocated to wireless telephone systems or a substantial portion of existing wireless frequencies. Moreover, current systems are reactive and restrictive. Current systems do not act until a mobile station is detected. When the current systems do act, it is to curtail the functionality of the mobile stations.

Additional general background, which helps to show the knowledge of those skilled in the art, may be found in the following: Laverghetta, Microwaves and Wireless Simplified (1998); and Balanis, Antenna Theory:

Analysis and Design (1997), both of which are hereby incorporated by reference.

SUMMARY OF THE INVENTION

The disclosed embodiments of present application provide a system and a method for modifying the behavioral characteristics of a mobile station terminal according to a functional location. A small transmitter, or button, which utilizes short range radio transmissions is used to define a functional location. The button is identified with particular functions using a device ID. In some of the disclosed embodiments, the button transmits the device ID continuously. In some other disclosed embodiments, the button transmission is triggered by a mobile station in proximity to the button. In some of the disclosed embodiments, the mobile station can store a mapping of device IDs to particular behaviors (or functions). In some other disclosed embodiments, the mobile station can request and receive a set of behaviors based on the device ID from a server attached to a telecommunications network. In some of the disclosed embodiments, receipt of a device ID can trigger a remote set of behaviors via a telecommunications network.

The disclosed embodiments can provide several advantages. For example, a low power button is a simple and inexpensive solution to providing location dependent services or functionality. It is possible to install such buttons in places where more expensive and sophisticated hardware would be at risk. Moreover, the small, unobtrusive button is easy to install, remove and relocate upon demand. For another example, the set of behaviors associated with a particular button can be defined and reconfigured centrally without requiring access to the button. For another example, a low power button allows an area which is considerably smaller than the micro or pico cells of a mobile cellular system to be defined. Such an area can be, for example, a building, a floor of a building, an office room, a shop, a department in a shop, etc. With smaller locations described functionally, as opposed to geographically, the functions performed by a mobile station can be augmented according to the mobile station's environment. Use of a small button can allow the ID defined location to be mobile, for example, when the button is installed in a vehicle. Also, the low cost, ease of use and flexibility of the proposed system and method allow individual end-users to purchase and install buttons to create their own location dependent services. Finally, the proposed system is proactive and expansive. The proposed system does not rely on the mobile station to make its presence known prior to changing the mobile station functionality. Moreover, when mobile station functionality is affected by a device ID, it is possible that the functionality will be expanded by a wide variety of different services, either at the mobile station or by behaviors taking place remote from the mobile station.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Various embodiments of the disclosed method and system will be described using Bluetooth as an example implementation platform. Bluetooth is an open specification for wireless communication of data and voice. It provides a universal bridge to existing data networks, a peripheral interface, and a mechanism to form small private ad hoc groupings of connected devices away from fixed network infrastructures. It is based on a low-cost short-range radio link, built into a relatively small (9 mm$^2$) microchip. The radio link is used to facilitate protected ad hoc connections for stationary and mobile communication environments.

Bluetooth radio links are designed to operate in a noisy radio frequency environment. Consequently, the Bluetooth radio uses a fast acknowledgement and frequency hopping scheme to make the link robust. Use of Forward Error Correction (FEC) limits the impact of random noise on long-distance links. The encoding schemes utilized by Bluetooth are optimized for uncoordinated environments. Bluetooth radios operate in the unlicensed ISM band at 2.4 GHz. The nominal link range for a Bluetooth radio link is 10 centimeters to 10 meters. However, the radio link range can be extended to more than 100 meters by increasing the transmit power.

Figure 1:
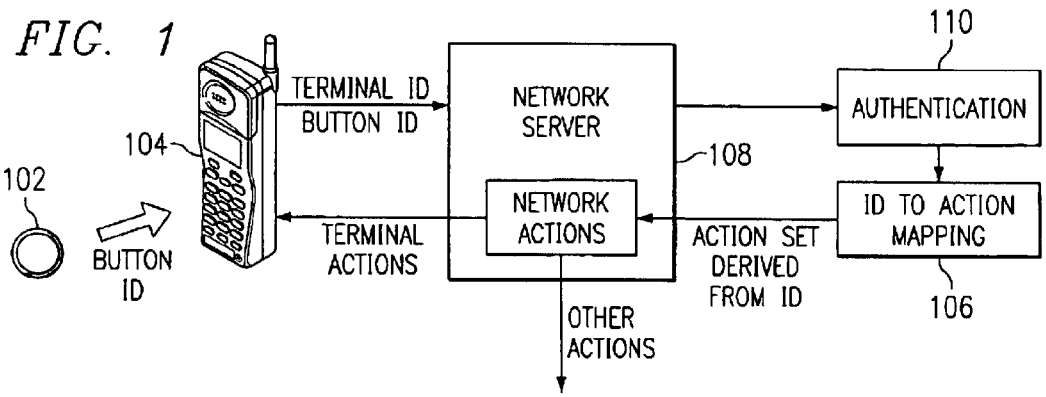
FIG. 1 depicts a block diagram of the system architecture of the presently preferred embodiment.

FIG. 1 depicts a block diagram of the system architecture of the presently preferred embodiment. In the presently preferred embodiment, a small transmitter 102 (or button), such as a Bluetooth transmitter, is used to define a functional location. Placement of the button 102 in a given location allows a specific coverage area to be defined. The size of the button and its effective transmitter range, currently 10 cm to 100 m for a button 102 based on Bluetooth, make it ideal for placement in confined spaces such as office buildings or airplanes.

In a manner similar to the hexagonal cells of modern wireless communications, the transmissions of the button 102 are tailored such that the power pattern of the antenna does not extend beyond a desired area. This technique allows for frequency-reuse in a limited space.

The button 102 does not necessarily need to have an omnidirectional radiation (field) pattern. The field pattern of the button 102 can be tailored to the environment in which it is placed. By adjusting the major, minor, side, and back lobes of the button antenna, a field pattern can be created which is tailored to any desired area of coverage. The button 102 can be adjusted to a wide range of coverage areas. For example, for button coverage in a long hallway, it may be desirable to place a transmitter at the end of a hallway. The field pattern of the button can be tailored to extend the length of the hallway but scaled so as to provide coverage that is only the width of the hallway. Such coverage avoids RFI by limiting the extent of the field pattern. Limiting RFI allows possible frequency reuse in a nearby hallway.

For another example, it may be impossible to find a geographic center for a given coverage area (assuming near-omnidirectional coverage). Utilizing conventional antenna construction techniques, it is possible to create a coverage area that conforms to the particular surroundings of the button 102. Designing a button 102 with different lobe characteristics can enable convenient location of the button 102 while still achieving the desired coverage area.

In the presently preferred embodiment, the button 102 continuously transmits a simple device ID code. Preferably, the device ID is hard-coded in the button 102. The transmission of the code allows the coverage area to be defined by the device ID. Once the ID is associated with particular functions (or behaviors), the coverage area is defined on the basis of it's function and not on it's geographical location.

In the presently preferred embodiment, the button is placed in a location, where a specific set of actions is to be initiated. Typical locations for a button include simple rooms or larger spaces. In the presently preferred embodiment, several buttons may transmit the same device ID. Simultaneous transmission of the same device ID enables wider coverage than is possible using just a single button. Transmission of duplicate device IDs can be used to define discontinuous coverage areas as the same functional area. That is, with the same device ID and thus, the area takes on the same functional aspects.

Figure 2A:
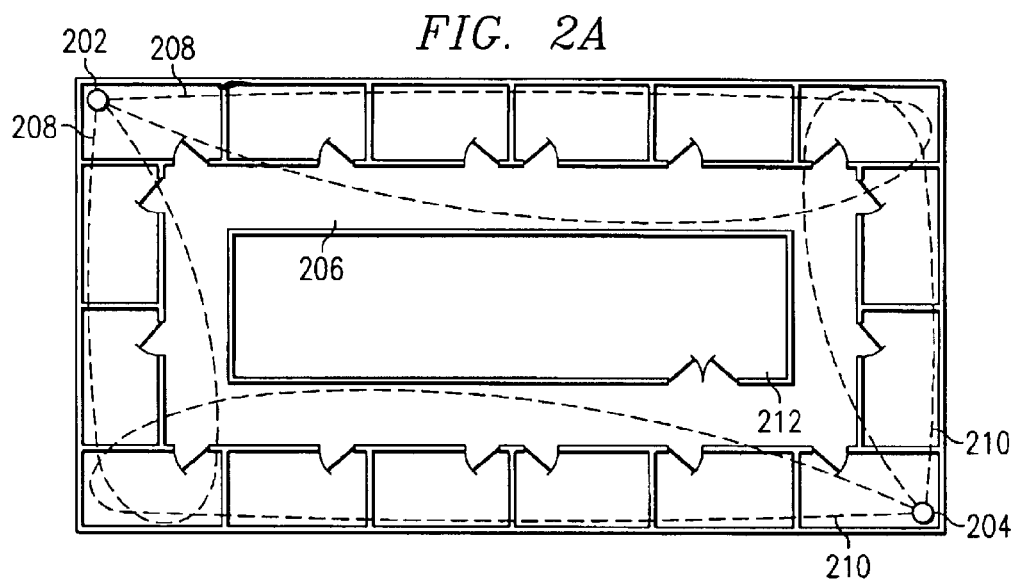
FIG. 2A depicts an example button coverage area for an office space.

FIG. 2A depicts an example button coverage area for an office space. In FIG. 2A, two buttons 202 and 204 are used to cover exterior office space 206. The coverage area of each button (208 for button 202 and 210 for button 204) is tailored to reach exterior office space and hallways but not into interior conference room 212. In this example, the button coverage 208 and 210 enables some parts 206 of a particular floor of an office building to receive the button 202 and 204 transmissions but not others, e.g., the conference room 212. In the example of FIG. 2A, the buttons are associated with the same device ID, creating a functional location which does not include the conference room 212. However, the buttons 202 and 204 could be associated with differing device IDs creating two separate functional locations, neither including the conference room 212.

Figure 2B:
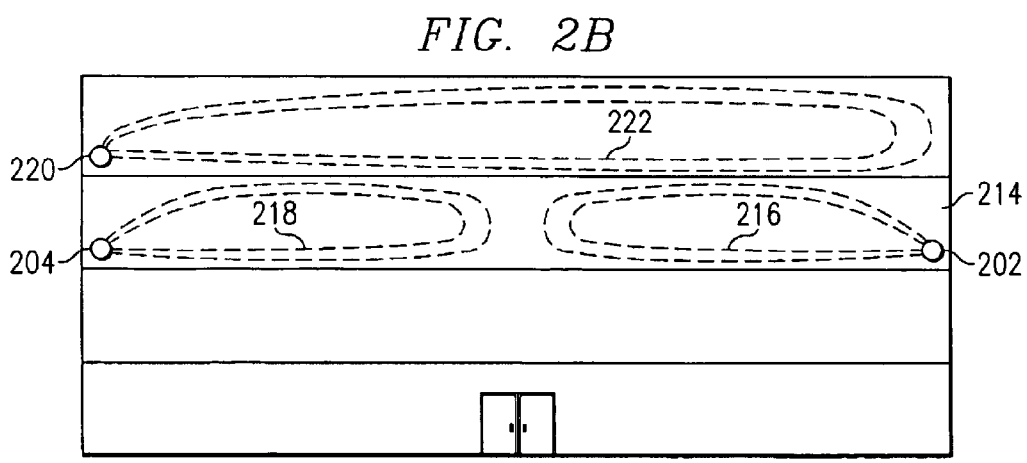
FIG. 2B depicts an example button coverage area for an office building.

FIG. 2B depicts an example button coverage area for an office building. Two buttons 202 and 204 are used on the third floor 214 of an office building. The two buttons are associated with differing device IDs to create two different functional locations 216 and 218, defined by the coverage areas of buttons 202 and 204 respectively, on the third floor 214. The lobe characteristics of the buttons 202 and 204 are adjusted to obtain coverage areas that do not extend to floors above or below the third floor 216. Another button 220 is used to define a functional location consisting of the entire fourth floor 222. Again the lobe characteristics of the button 220 are adjusted so that the coverage area does not extend beyond the fourth floor.

In the presently preferred embodiment, a mobile station 104 is designed to receive the device ID transmitted by the button 102 when in the coverage area of the button 102. Each device ID is identified with a corresponding set of actions or functions. In the presently preferred embodiment, the mobile station 104 is connected to a telecommunication network using the particular protocol of the mobile station 104 e.g., GSM, TDMA, CDMA2000, etc. The mapping of device IDs to functions 106 is stored on a network server 108. Upon receipt of a device ID from a button 102, the mobile station 104 queries the network server 108 for the actions it should take 106 which correspond to the device ID received from the button 102. The network server 108 retrieves the actions 106 and downloads them to the mobile station 104. The mobile station then executes the stored procedures. For example, the Wireless Application Protocol, (or WAP) can be used as a platform from which mobile station functions are implemented. The executed functions can also instruct the mobile station 104 or the network server 108 to send certain information so that functions can be performed elsewhere.

The system may also incorporate an authentication mechanism 110 to ensure that the mobile station and server are responding to legitimate buttons. Such a mechanism can been implemented through, for example, a certificate scheme, to ensure that only known or trusted actions are carried out. Alternatively, the authentication mechanism can be implemented on the mobile station 104.

Some functions may be executed locally on the network server 108 or at a location apart from the mobile station 104. For example, a security monitoring system could be implemented using several buttons 102 with differing device IDs. Whenever a mobile station comes within the coverage area of a different device ID, it responds with a query to the network server 108. The response would include, at a minimum, the ID of the button 102 and the ID of the mobile station 104. The corresponding behavior would be executed in the network server 108 by storing the location and time of the query, along with the mobile station ID in a security database.

If the mobile station is not able to access a telecommunications network, the mapping between the device ID and the corresponding action, as well as the action procedure can be stored in the mobile station's memory.

Figure 4:
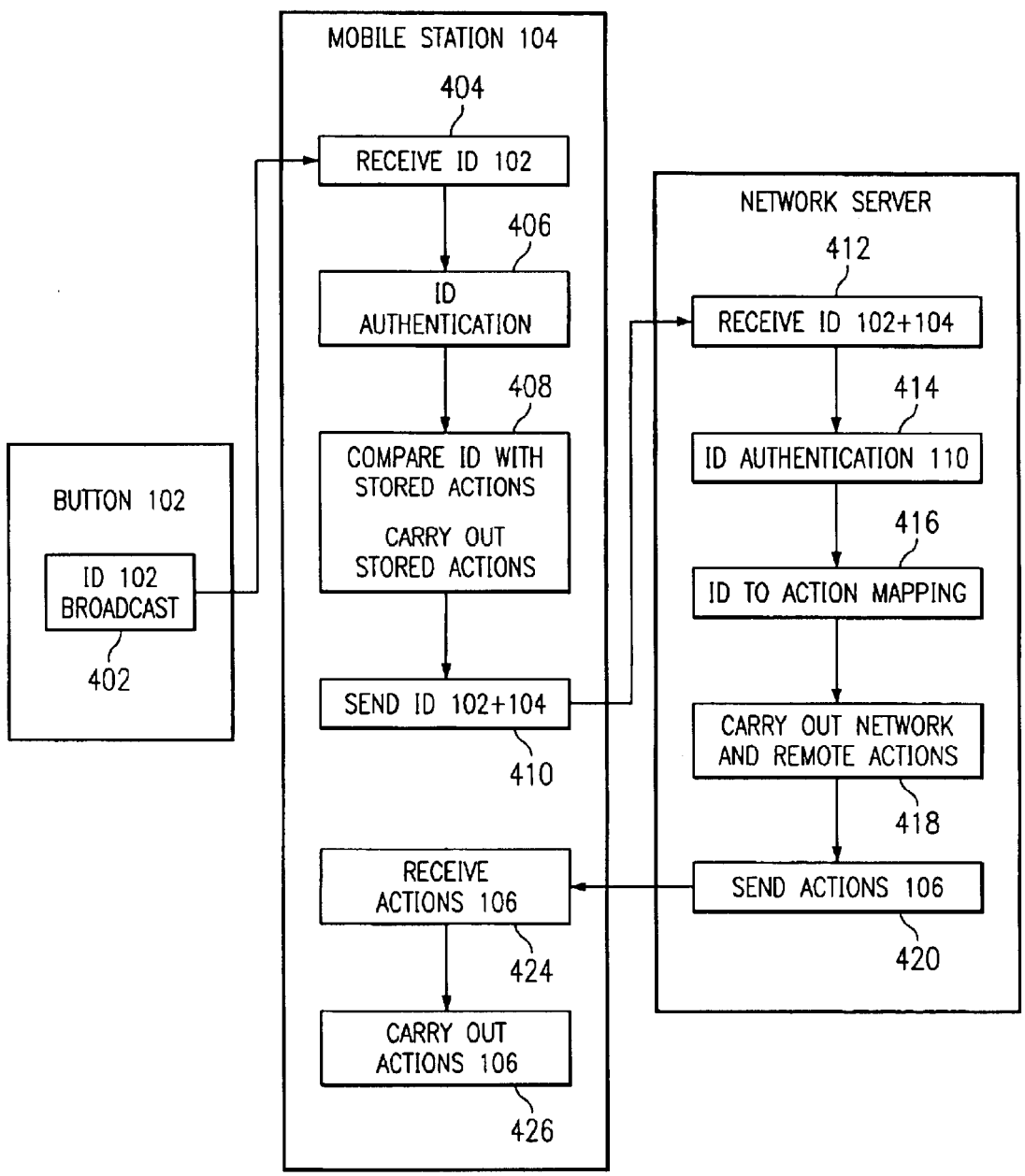
FIG. 4 depicts a flow chart of the location specific, automatic mobile station behavior control system.

FIG. 4 depicts a flow chart of an embodiment of the location specific, automatic mobile station behavior control system. A button 102 broadcasts a device ID (either continuously or intermittently) (Step 402). A mobile station 104 receives the device ID (Step 404). The mobile station can be configured to authenticate the received device ID (Step 406). If the device ID is authenticated and the mobile station is configured to store a behavior mapping, the device ID is mapped and the stored behaviors are executed (Step 408). The mobile station can then transmit the device ID and a mobile station ID to a network server (Step 410). The network server receives the device ID (Step 412). The network server is configured to authenticate the received device ID (Step 414). If the device ID is authenticated, the device ID is mapped (Step 416). If any of the stored behaviors include actions to be taken by the network server or remote systems, those behaviors are executed. (Step 418). The network server then transmits the behaviors to be executed by the mobile station 104 (Step 420). The mobile station 104 receives the behaviors to be executed (Step 422) and executes them (Step 424).

The system of location based behavior can also take advantage of the memory of the mobile station 104 by frequently updating the memory to contain the actions for recently received or other significant device ID's. Last in-first out or other predictive schemes can be used to load procedures into mobile station memory. Such techniques can significantly reduce the wireless network load.

A mobile station 104 may also be combined with a button 102. Attaching a button 102 to a mobile station 104 creates a mobile functional location. This sort of functional location can be useful for creating a personal identity broadcast system. Moreover, creating dynamic functional locations allows for the implementation of a system in which different mobile stations can negotiate their priority (or pecking order) on the basis of the other mobile stations in the area. For example, to avoid burdening a wireless system during an emergency situation, some mobile stations may be directed to switch off when in the presence of a higher priority mobile station.

The device ID itself may be given a hierarchy (or pecking order). The network server 108 or the mobile station 104 itself may be configured for different levels of device ID acceptance. For example, a mobile station may be configured to discard or ignore particular device IDs. This prohibition may also be given time limits such as during work hours. In like manner, certain device IDs may be predefined such that they are always recognized. Such device IDs can be, for example, those of officials or authorities.

Mobile station status is defined by the parties that may initiate communication with a mobile station, the types of communication accepted (messaging, voice, video, etc.), and what priorities of communication are accepted. In the presently preferred embodiment, implemented functions will enable altering the mobile station status automatically, according to the received device ID. The parameters which define the mobile station status may be altered to reduce functionality according to mobile station behavior required by a particular functional location. For example, buttons placed at the entrance to a meeting room may broadcast device IDs which map to the function of switching a mobile station into a silent mode. Such a function is useful in locations where RFI is not a concern but ambient noise is. By contrast, buttons at, for example, hospital entrances, may create a functional location in which high-power radio communications from the mobile station are switched off.

Alteration of mobile station status may also be required in order to allow the mobile station to continuously deliver communications at a level that is optimally suited for the user's changing communications need and ability. For example, a place of worship may be defined as a functional location in which all communications are switched off. By contrast, a vehicle may be defined as a functional location wherein only potentially distracting modes of communication are switched off.

Functional locations may also be defined to enable certain applications to be downloaded and used. For example, lobbies or common areas with predictably long waits can be defined as functional locations. When a mobile station enters this functional location, a menu of location based applications can be created. Such a menu can include leisure games which can be downloaded and played on the mobile station. Depending on the context, such games could be combined with the added incentive of win frequent flyer points. The WAP can utilize this form of functional location Buttons may also be installed at home or work locations. A useful function for a button installed in the home is notification of arrivals and departures of children. At work, an executive terminal can be configured with a button to create a dynamic functional location. The device ID can trigger other mobile stations, for example, those belonging to subordinates, to change status to a non-distracting mode. Such functions can be coupled with authentication to verify that the action request is initiated by a trusted party.

Delivery of location based advertisements can be accomplished by, for example, defining an aisle of a store as a functional location. Such a functional location can enable e-commerce with high precision. For example, an application listing special offers in the dairy products department may be delivered to the mobile stations of customers as they enter the department.

Finally, an array of predefined standard device IDs may be mapped to common functions. For example, in a hospital or an airplane, a standard ID can be created which forces the status of the mobile station to automatically cease potentially harmful radio communication. Such standard device IDs can be preprogrammed into the memory of the mobile terminals. Once encoded in the mobile station, the functionality mapped to the ID can be honored without the need for network connectivity and downloading of function mappings and applications.

In functional locations in which positioning accuracy is not important and neither three-dimensional positioning nor authentication of device IDs is needed, the mobile station 104 can derive an absolute or relative position, e.g., a longitude and latitude, instead of receiving a device ID. The positioning information can be transmitted to the network server 108 for mapping to a set of behaviors or mapped locally at the mobile station 104. Such positioning information can be obtained from positioning systems such as GPS.

Figure 3:
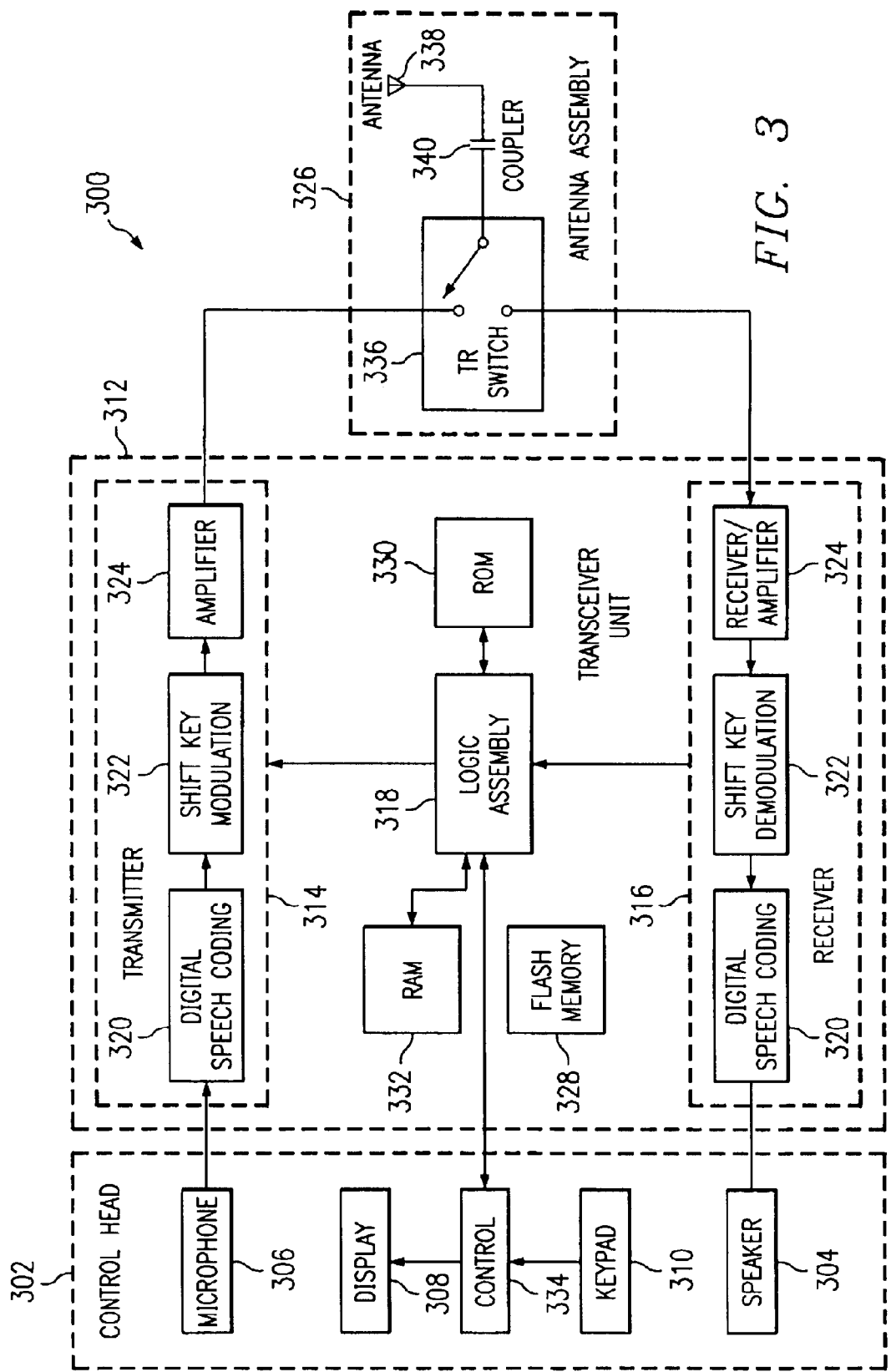
FIG. 3 depicts a block diagram of a mobile station that can make use of the disclosed embodiments.

FIG. 3 depicts a block diagram of a mobile station 300 that can make use of the disclosed embodiments. The mobile station 300 includes, in this example:

A control head 302 containing an audio interface, i.e. a speaker 304 and microphone 306.The control head 302 generally includes a display assembly 308 allowing a user to see dialed digits, stored information, messages, calling status information, including signal strength, etc. The control head generally includes a keypad 310, or other user control device, allowing a user to dial numbers, answer incoming calls, enter stored information, and perform other mobile station functions. The control head also has a controller unit 334 that interfaces with a logic control assembly 318 responsible, from the control unit perspective, for receiving commands from the keypad 310 or other control devices, and providing status information, alerts, and other information to the display assembly 308;

A transceiver unit 312 containing a transmitter unit 314, a receiver unit 316, and the logic control assembly 318. The transmitter unit 314 converts low-level audio signals from the microphone 306 to digital coding using a codec (a data coder/decoder) 320. The digitally encoded audio is represented by modulated shifts, for example, in the frequency domain, using a shift key modulator/demodulator 322. Other codes transmission utilized by the logic control assembly 318, such as station parameters and control information, may also be encoded for transmission. The modulated signal is then amplified 324 and transmitted via an antenna assembly 326. Transmission of the mobile station and button IDs occurs in the transmitter unit;

The antenna assembly 326 contains a TR (transmitter/receiver) switch 336 to prevent simultaneous reception and transmission of a signal by the mobile station 300. The transceiver unit 312 is connected to the antenna assembly 326 through the TR switch 336. The antenna assembly contains at least one antenna 338;

The receiver unit 516 receives a transmitted signal via the antenna assembly 326. The signal is amplified 324 and demodulated 322. If the signal is an audio signal, it is decoded using the codec 320. The audio signal is then reproduced by the speaker 304. Other signals are handled by the logic control assembly 318 after demodulation 322. Receipt of a button 102 transmission, that is, a device ID and any function mapping or application downloads occurs in the receiver unit; and A logic control assembly 318 usually containing an application specific integrated circuit (or ASIC) combining many functions, such as a general purpose microprocessor, digital signal processor, and other functions, into one integrated circuit. The logic control assembly 318 coordinates the overall operation of the transmitter and receiver using control messages. In the presently preferred embodiment, receipt of a device ID triggers the logic control assembly to execute code which controls network connectivity and implementation of the indicated behaviors. Generally, the logic control assembly operates from a program that is stored in flash memory 328 of the mobile station. Flash memory 328 allows upgrading of operating software, software correction or addition of new features. Flash memory 328 is also used to hold user information such as speed dialing names and stored numbers. The various disclosed embodiments are typically stored for execution from this or another section of the mobile station's memory.

In addition to flash memory 328, the mobile station will typically contain read only memory (ROM) 330 for storing information that should not change, such as startup procedures, and random access memory (RAM) 332 to hold temporary information such as channel number and system identifier.

As will be recognized by those skilled in the art, the innovative concepts described in the present application can be modified and varied over a tremendous range of applications, and accordingly the scope of patented subject matter is not limited by any of the specific exemplary teachings given.

For example, multi-button locations have been described in which all of the buttons transmit the same device ID. However, it is possible that a functional location has several buttons, each transmitting a different device ID. Receipt of multiple device IDs indicates overlapping functional areas.

Protocols to resolve conflicting functions can be implemented by the mobile station or the network server.

For another example, in the presently preferred embodiment, the button transmission is described as constant. However, the button can be configured to monitor the functional location for the presence of a mobile station. When a mobile station is in proximity to the functional location, transmission of the button ID is triggered.

For another example, the buttons have been described as transmitting only a single device ID. However, it is possible to design a button which transmits multiple device IDs. The multiple device IDs can be used to indicate different functions to be performed based on, for example, a hierarchy of mobile stations, the type of mobile station, or the capabilities of mobile station, that is, WAP extended capabilities, etc.

For another example, the network server is described as receiving a device ID and a mobile station ID. However, the mobile station can be configured to transmit (and the network server to receive) other type of location information that can trigger a set of behaviors to be executed. Moreover, the mobile station can be configured to accept device ID when not actually in the functional location of the device ID. Thus, behaviors can be triggered based on a known device ID, regardless of reception by the mobile station.

What is claimed is:

1. A method of controlling mobile station behavior, comprising the steps of:
   receiving location information in a mobile station from a button;
   mapping said location information to a set of behaviors; and
   performing functions to implement said set of behaviors;
   wherein said mobile station acts in a location dependent manner.

2. A method of controlling mobile station behavior, comprising the steps of:
   receiving at least one device ID in a mobile station from a button;
   mapping said device ID to a set of behaviors; and
   performing functions to implement said set of behaviors;
   wherein said mobile station acts in a location dependent manner.

3. A method of controlling mobile station behavior, comprising the steps of:
   receiving at least one device ID from a button and mobile station ID at a network server;
   mapping said device ID to a set of behaviors;
   transmitting to a mobile station the behaviors of said set of behaviors to be performed by said mobile station; and
   performing functions to implement said set of behaviors;
   wherein said mobile station acts in a location dependent manner.

4. A location specific automatic mobile station control system, comprising:
   a mobile station configured to derive location information from a button configured to transmit said location information;
   wherein said location information is mapped to a set of behaviors and said behaviors are implemented.

5. A location specific automatic mobile station control system, comprising:
   a mobile station configured to derive location information from a button wherein said location information is mapped to a set of behaviors and said behaviors are implemented;
   a network server configured to received said location information and a mobile station ID and transmit functions to implement behaviors based on the functional location of said mobile station wherein said network server maps said location information to a set of behaviors and implements said behaviors.

6. A location specific automatic mobile station control system, comprising:
   a mobile station configured to derive location information from a button;
   wherein said mobile station maps said location information to a set of behaviors and implements said behaviors.

7. A location specific automatic mobile station control system, comprising:
   a mobile station configured to derive location information from a button wherein said location information is mapped to a set of behaviors and said behaviors are implemented;
   a network server wherein said network server authenticates said location information before mapping said location information.

8. A location specific automatic mobile station control system, comprising:
   a mobile station configured to derive location information from a button wherein said location information is mapped to a set of behaviors and said behaviors are implemented;
   a network server wherein said network server implements one of said behaviors according to said functional location of said mobile station.

9. A location specific automatic mobile station control system, comprising:
   a mobile station configured to derive location information from a button wherein said location information is mapped to a set of behaviors and said behaviors are implemented;
   a network server wherein said network server triggers action at remote locations according to said functional location of said mobile station.

10. A location specific automatic mobile station control system, comprising:
    a button configured to transmit at least one device ID; and
    a mobile station configured to receive said device ID;
    wherein said mobile station maps said device ID to a set of behaviors and implements said behaviors.

11. The system of claim 10, wherein said mobile station authenticates said device ID before mapping said device ID.

12. The system of claim 10, wherein one of said behaviors is switching said mobile station into a silent mode.

13. The system of claim 10, wherein a field pattern of said button defines a functional location.

14. The system of claim 10, wherein a field pattern of said button is not omnidirectional.

15. The system of claim 10, wherein one of said behaviors is switching said mobile station into a mode in which the potential for radio frequency interference from said mobile station is minimized.

16. The system of claim 10, wherein said button is hard coded with a device ID.

17. The system of claim 10, wherein said device ID of said button is configurable.

18. The system of claim 10, wherein one of said behaviors uses the wireless application protocol.

19. The system of claim 10, wherein the memory of said mobile station is updated with device IDs and functions according to a predictive scheme.

20. The system of claim 10, wherein the transmission of said device ID by said button is triggered by a mobile station.

21. A location specific automatic mobile station control system, comprising:

a button configured to transmit at least one device ID;

a mobile station configured to receive said device ID and transmit said device ID and a mobile station ID; and a network server configured to receive said device ID and said mobile station ID and transmit functions to implement behaviors based on the functional location of said mobile station;

wherein said network server maps said device ID to a set of behaviors and implements said behaviors.

22. The system of claim 21, wherein said network server authenticates said device ID before mapping said device ID.

23. The system of claim 21, wherein said network server implements one of said behaviors according to said functional location of said mobile station.

24. The system of claim 21, wherein said network server triggers actions at remote locations according to said functional location of said mobile station.

25. The system of claim 21, wherein one of said behaviors is switching said mobile station into a silent mode.

26. The system of claim 21, wherein one of said behaviors is switching said mobile station into a mode in which the potential for radio frequency interference from said mobile station is minimized.

* * * * *